(12) United States Patent
Emura et al.

(10) Patent No.: US 8,142,923 B2
(45) Date of Patent: Mar. 27, 2012

(54) BATTERY

(75) Inventors: Katsuji Emura, Itami (JP); Takashi Uemura, Itami (JP); Hideaki Awata, Itami (JP); Kentaro Yoshida, Itami (JP); Mitsuyasu Ogawa, Itami (JP); Rikizo Ikuta, Itami (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 431 days.

(21) Appl. No.: 12/444,939

(22) PCT Filed: Nov. 15, 2007

(86) PCT No.: PCT/JP2007/072189
§ 371 (c)(1),
(2), (4) Date: Apr. 9, 2009

(87) PCT Pub. No.: WO2008/065900
PCT Pub. Date: Jun. 5, 2008

(65) Prior Publication Data
US 2010/0028775 A1 Feb. 4, 2010

(30) Foreign Application Priority Data
Nov. 30, 2006 (JP) .................... 2006-324715

(51) Int. Cl.
*H01M 6/12* (2006.01)
*H01M 2/18* (2006.01)
(52) U.S. Cl. ..................... 429/162; 429/247
(58) Field of Classification Search ............ 429/209, 429/162, 247
See application file for complete search history.

(56) References Cited

U.S. PATENT DOCUMENTS

| | | | |
|---|---|---|---|
| 5,540,742 | A | 7/1996 | Sangyoji et al. |
| 2004/0081860 | A1 | 4/2004 | Hundt et al. |
| 2005/0208353 | A1 | 9/2005 | Johnson |

FOREIGN PATENT DOCUMENTS

| | | |
|---|---|---|
| JP | 10-083838 | 3/1998 |
| JP | 2005-063958 | 3/2005 |
| JP | 2005-174792 | 6/2005 |
| JP | 2005-251417 | 9/2005 |
| JP | 2006-147210 | 6/2006 |
| JP | 2006-261001 | 9/2006 |
| WO | WO 2007/034709 | 3/2007 |

*Primary Examiner* — Joseph Kosack
(74) *Attorney, Agent, or Firm* — Drinker Biddle & Reath LLP

(57) ABSTRACT

The battery of the invention has a positive-electrode layer 20, a negative-electrode layer 50, and an electrolytic layer 40 through which ionic conduction is performed between the two electrode layers. In this battery, the positive-electrode layer 20 and the negative-electrode layer 50 are laminated with each other and an insulating layer 30 is placed between the positive-electrode layer 20 and the negative-electrode layer 50. The insulating layer 30 has an area smaller than that of one of the positive-electrode layer 20 and the negative-electrode layer 50 and larger than that of the other. There is no place where the positive-electrode layer 20 and the negative-electrode layer 50 face each other through only the electrolytic layer 40. Even when the electrolytic layer 40 has a pinhole, the presence of the insulating layer 30 between the positive-electrode layer 20 and the negative-electrode layer 50 can suppress short-circuiting between the positive- and negative-electrode layers.

6 Claims, 2 Drawing Sheets

BATTERY

TECHNICAL FIELD

The present invention relates to a battery, particularly to a battery suitable to be used as a thin-film Li secondary battery.

BACKGROUND ART

Researchers and engineers have been advancing the research and development of a thin-film battery mainly as a battery having a capacity as extremely small as several to several tens of microampere-hours among all-solid-state batteries. The battery has a laminated structure in which, for example, a positive-electrode layer, a solid electrolytic layer, and a negative-electrode layer are placed successively either on a metal foil used as a collector or on a metal film formed on a ceramic substrate made of, for example, alumina. The individual layers are produced through the vapor deposition method, such as the sputtering method. The solid electrolytic layer is formed by using an oxide, and the negative-electrode layer is formed by using metallic lithium (see Patent literatures 1 and 2, for example).

On the other hand, there is another type of battery, which has a structure in which the positive-electrode layer and the negative-electrode layer are juxtaposed on the same plane, without laminating them (see Patent literature 3, for example). This battery has a positive-electrode layer provided on a positive-electrode-side collector formed on a substrate and a negative-electrode layer provided on a negative-electrode-side collector formed on the same substrate. Both collectors and both electrode layers are formed to have the shape of the teeth of a comb. The comb teeth of the positive-electrode layer and the comb teeth of the negative-electrode layer are placed to mesh with each other such that a tooth of one polarity is sandwiched between two teeth of the other polarity. A solid electrolyte is placed between the comb tooth of the positive-electrode layer and that of the negative-electrode layer.

Patent literature 1: the published Japanese patent application Tokukai 2005-251417
Patent literature 2: the published Japanese patent application Tokukaihei 10-83838
Patent literature 3: the published Japanese patent application Tokukai 2006-147210 (FIG. 1).

DISCLOSURE OF THE INVENTION

Problem to be Solved by the Invention

The above-described thin-film batteries, however, have the problem described below.

In the thin-film battery having a laminated structure, the positive-electrode layer and the negative-electrode layer are placed such that one of them is placed above the other. Consequently, especially when a foreign matter adheres on the underlying member at the time the solid electrolytic layer is formed, the solid electrolytic layer is likely to form a pinhole. The pinhole creates a problem of causing a short circuit between the positive- and negative-electrode layers. This problem reduces the manufacturing yield of the thin-film battery. In addition, the inspection to find whether or not a pinhole is formed in the electrolytic layer takes time and labor. Furthermore, in this type of thin-film battery, in the case where a capacity increase is intended by enlarging the formed area of the electrode layers and the solid electrolytic layer, even when one pinhole is formed in the solid electrolytic layer, a short circuit occurs between the positive- and negative-electrode layers, rendering the battery unable to function. What is more, to prevent the pinhole from forming, it is necessary to install a clean room that has a high cleanliness to become free of dust. The installation requires an enormous equipment cost.

On the other hand, in the thin-film battery that has a structure in which the comb-tooth-shaped electrode layers are placed on the same plane, there is no place where the electrode layers overlap with each other. Consequently, this structure can solve the above-described problem of short-circuiting between the electrode layers. This structure, however, requires to juxtapose the positive-electrode layer and the negative-electrode layer on the same plane. This arrangement necessarily increases the total area of the battery in comparison with the battery having a laminated structure. In other words, there has been a problem in that when the same battery output is specified, the thin-film battery having the comb-tooth-shaped electrode layers is required to have a larger battery area than that of the battery having a laminated structure.

The present invention is made in view of the above-described circumstances. An object of the present invention is to offer a battery that has a structure in which a positive-electrode layer and a negative-electrode layer are laminated with each other but that can eliminate problems caused by the formation of a pinhole in the electrolytic layer.

Means for Solving the Problem

The battery of the present invention has a positive-electrode layer, a negative-electrode layer, and an electrolytic layer through which ionic conduction is performed between the two electrode layers. In this battery, the positive-electrode layer and the negative-electrode layer are laminated with each other and an insulating layer is placed between the positive-electrode layer and the negative-electrode layer. The insulating layer has an area smaller than that of one of the positive-electrode layer and the negative-electrode layer and larger than that of the other. There is no place where the positive-electrode layer and the negative-electrode layer face each other through only the electrolytic layer.

Even when the electrolytic layer has a pinhole, the presence of the insulating layer between the positive-electrode layer and the negative-electrode layer can suppress short-circuiting between the positive- and negative-electrode layers.

Because the positive-electrode layer and the negative-electrode layer are laminated with each other, the battery can have a smaller battery area than that of a battery having a structure in which comb-tooth-shaped positive- and negative-electrode layers are juxtaposed on the same plane.

In addition, the insulating layer has an area smaller than that of one of the positive-electrode layer and the negative-electrode layer and larger than that of the other. Furthermore, there is no place where the positive-electrode layer and the negative-electrode layer face each other through only the electrolytic layer. Consequently, the ionic conduction between the positive- and negative-electrode layers can be performed through the electrolytic layer and along the surface of the insulating layer, not in the direction of the thickness of the insulating layer.

According to an aspect of the battery of the present invention, it is desirable that the battery be a primary battery.

Although the battery has a structure in which the positive- and negative-electrode layers are laminated with each other, the above-described structure enables the forming of a primary battery that can solve various problems caused by the formation of a pinhole in the electrolytic layer.

According to another aspect of the battery of the present invention, it is desirable that the battery be a secondary battery.

Although the battery has a structure in which the positive- and negative-electrode layers are laminated with each other, the above-described structure enables the forming of a secondary battery that can solve various problems caused by the formation of a pinhole in the electrolytic layer.

According to yet another aspect of the battery of the present invention, it is desirable that one of the positive-electrode layer and the negative-electrode layer have a simple planar shape and the other have a complicated planar shape having an outer-edge line longer than that of the simple planar shape.

According to the battery of the present invention, the ionic conduction between the positive- and negative-electrode layers is performed through the electrolytic layer and along the surface of the insulating layer. Consequently, when the outer-edge line of the electrode layer can be increased, the route for carrying out the ionic conduction can be secured in a wider area. Therefore, when one of the positive- and negative-electrode layers has a complicated planar shape, more conduction routes for the ions can be secured, enabling the battery to have a further increased output.

According to yet another aspect of the battery of the present invention, it is desirable that the positive-electrode layer, the negative-electrode layer, the electrolytic layer, and the insulating layer are all composed of materials having resistance to heat against the temperature at the time the battery undergoes reflow soldering.

The use of the above-described composition enables the structuring of a battery that is ready for a reflow soldering process for mounting the battery on a circuit board through solder.

According to yet another aspect of the battery of the present invention, it is desirable that the electrolytic layer and the insulating layer be placed between the positive-electrode layer and the negative-electrode layer.

When this structure is employed, both of the electrolytic layer and the insulating layer are placed between the positive- and negative-electrode layers. Consequently, even if at least one of the electrolytic layer and the insulating layer has pinholes, it is less likely that a pinhole in one layer coincides with a pinhole in the other layer. Therefore, short-circuiting between the positive- and negative-electrode layers can be more reliably prevented.

EFFECT OF THE INVENTION

According to the thin-film lithium battery of the present invention, the insulating layer is provided between the positive-electrode layer and the negative-electrode layer. Consequently, even when the solid electrolytic layer has a pinhole, practically no short circuit between the two electrode layers is caused due to the presence of the pinhole. As a result, the battery can maintain its function.

DESCRIPTION OF THE SIGNS

Figure 1:
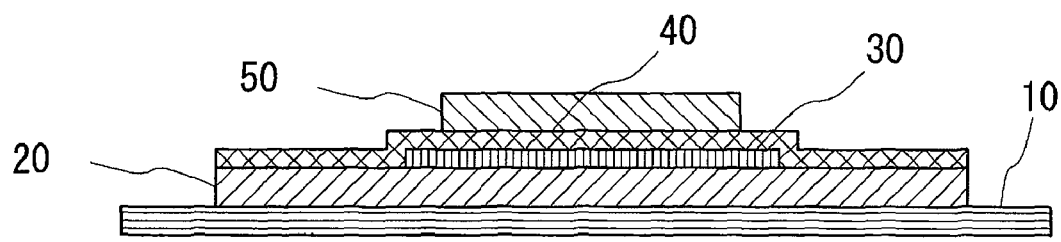
FIG. 1 is a vertical sectional view of the battery in Example 1 of the present invention.

10: Substrate
20: Positive-electrode layer
30: Insulating layer
40: Electrolytic layer
50: Negative-electrode layer.

BEST MODE FOR CARRYING OUT THE INVENTION

The constitutions of the individual portions of the battery of the present invention are explained below in further detail.
Basic Structure of the Battery The battery of the present invention has a structure in which a positive-electrode layer, a negative-electrode layer, an electrolytic layer, and an insulating layer are laminated. Providing that this structure can be employed, there is no limitation in the type of battery. The types of the battery of the present invention include not only the primary battery, which cannot be recharged, but also the secondary battery, which can be recharged. The types of primary battery include a manganese dry cell, an alkaline dry cell, and a lithium cell. The types of secondary battery include a nickel-cadmium battery, a nickel-hydrogen battery, and a lithium-ion battery. In particular, the structure of the battery of the present invention can be suitably applied to a battery incorporating a solid electrolyte. Most of all, the structure of the present invention is most suitable for a lithium-ion secondary battery.

The types of combination of specific materials for the positive and negative electrodes of individual batteries include the following:

Graphite fluoride-lithium battery: positive electrode: graphite fluoride; negative electrode: lithium
Manganese dioxide-lithium battery: positive electrode: manganese dioxide; negative electrode: lithium
Iron sulfide-lithium battery: positive electrode: iron sulfide; negative electrode: lithium
Copper oxide-lithium battery: positive electrode: copper oxide; negative electrode: lithium
Lithium-ion battery: positive electrode: lithium composite oxide; negative electrode: carbon.

Furthermore, the structure of the battery of the present invention can be applied to batteries having various shapes such as a cylindrical battery, a button battery, a coin-type battery, and a thin-film battery.
Positive-Electrode Layer
Material of Positive-Electrode Layer The positive-electrode layer is constituted by a layer containing an active material that occludes and releases ions. In the case of the lithium-ion battery, the positive-electrode layer may be suitably formed by using either an oxide, such as one member selected from the group consisting of lithium cobalt oxide ($LiCoO_2$), lithium nickel oxide ($LiNiO_2$), lithium manganate ($LiMn_2O_4$), and olivine-type lithium iron phosphate ($LiFePO_4$), or a mixture of these. In addition, the positive-electrode layer may be composed of either a sulfide, such as one member selected from the group consisting of sulfur (S), lithium sulfide, and titanium sulfide ($TiS_2$), or a mixture of these. Moreover, the types of the material for the positive-electrode layer include lithium copper oxide ($Li_2CuO_2$) and vanadium oxide, such as $LiV_3O_3$, $V_2O$, and $Cu_2V_2O_7$. All of the above-described oxides have resistance to heat against the heating temperature 200° C. to 250° C. or so) at the time of the reflow soldering. It is desirable that the positive-electrode layer have a thickness of 10 to 300 μm or so, more desirably at most 100 μm, and most desirably at most 30 μm.

Method of Forming Positive-Electrode Layer

The positive-electrode layer can be formed by using the wet method or the dry method. The types of wet method include a sol-gel method, a colloidal method, and a casting method. The types of dry method include a vapor deposition method, such as an evaporation method, an ion-plating method, a sputtering method, and a laser ablation method.

Negative-Electrode Layer

Material of Negative-Electrode Layer

The negative-electrode layer, also, is constituted by a layer containing an active material that occludes and releases ions. In the case of the lithium-ion battery, the negative-electrode layer may be suitably formed by using either one member selected from the group consisting of metallic lithium and metals that can form alloy with metallic lithium or a mixture or alloy of these. It is desirable that the metal that can form alloy with Li be at least one member selected from the group consisting of aluminum (Al), silicon (Si), tin (Sn), bismuth (Bi), zinc (Zn), and indium (In). This metal is hereinafter referred to as "an alloying material." In addition, the types of material for the negative-electrode layer include a carbon material such as graphite, a lithium titanium oxide having a spinel structure such as $Li_4Ti_5O_{12}$, $Li_4Fe_{0.5}Ti_{12}$, and $Li_4Zn_{0.5}Ti_5O_{12}$, a sulfide such as $TiS_2$, a nitrogen compound such as $LiCo_{2.6}O_{0.4}N$, and a mixture of these. Of these materials, the carbon material, the oxides, and the like have resistance to heat against the heating temperature (200° C. to 250° C. or so) at the time of the reflow soldering. It is desirable that the negative-electrode layer have a thickness of 0.5 to 80 μm or so, more desirably 1 to 40 μm.

The negative-electrode layer composed of the above-described alloy is desirable because the negative-electrode layer can also have the function of the collector on its own and has a high ability to occlude and release lithium ions. In particular, silicon (Si) has a higher ability to occlude and release lithium than that of graphite (black lead), so that the energy density can be increased.

The use of an alloy phase with metallic lithium for the material of the negative-electrode layer has an effect of reducing the moving resistance of Li ions at the interface between the alloying material alloyed with metallic lithium and the solid electrolytic layer having Li-ion conductivity. Consequently, the increase in the resistance of the alloying material can be reduced at the initial stage of charging at the first cycle.

When an alloying material is used singly to form the negative-electrode layer, there is a problem in that the discharging capacity is considerably decreased from the charged capacity at the first charging-and-discharging cycle. On the other hand, when metallic lithium and an alloying material is alloyed in advance to be used as the material for the negative-electrode layer, the problem of irreversible capacity is almost eliminated. Consequently, it is not necessary to fill the positive-electrode active material with a surplus amount for the irreversible capacity. As a result, the capacity density of the thin-film battery can be increased.

Method of Forming Negative-Electrode Layer

It is desirable that the negative-electrode layer be formed by using the vapor deposition method. The types of vapor deposition method include the physical vapor deposition (PVD) method and the chemical vapor deposition (CVD) method. More specifically, the types of the PVD method include a vacuum evaporation method, a sputtering method, an ion-plating method, and a laser ablation method. The types of the CVD method include a hot CVD method and a plasma CVD method.

Electrolytic Layer

As the solid electrolyte, a material is used that has ionic conductivity but has an electronic conductivity as small as ignorable. In the case of the electrolytic layer for a lithium-ion battery, it is desirable to use a solid electrolytic layer that is made of Li-ion-conducting material, that has an Li-ion conductivity of $10^{-5}$ S/cm or more at 20° C., and that has an Li-ion transport number of 0.999 or more. In particular, it is recommended that the Li-ion conductivity be $10^{-4}$ S/cm or more and that the Li-ion transport number be 0.9999 or more.

It is desirable that the solid electrolytic layer be made of sulfide-based material. More specifically, it is desirable that the solid electrolytic layer contain Li, P, or S. The solid electrolytic layer may further contain oxygen. For example, the solid electrolytic layer can be formed suitably by using such a material as a lithium-ion-conducting sulfide-glassy solid electrolyte, such as $Li_3PO_4$, LiPON, which is formed by adding nitrogen to $Li_3PO_4$, $Li_2S-SiS_2$, $Li_2S-P_2S_5$, or $Li_2S-B_2S_3$; or a lithium-ion-conducting solid electrolyte formed by doping, into the foregoing glass, lithium halide such as LiI or a lithium oxoacid salt such as $Li_3PO_4$. The solid electrolytic layer composed of the above-described composite oxide has resistance to heat against the heating temperature (200° C. to 250° C. or so) at the time of the reflow soldering. It is desirable that the solid electrolytic layer have a thickness of 3 to 80 μm or so, more desirably 5 to 20 μm.

Method of Forming Solid Electrolytic Layer

It is desirable that the solid electrolytic layer be formed by using the vapor deposition method. The types of vapor deposition method include the physical vapor deposition (PVD) method and the chemical vapor deposition (CVD) method. More specifically, the types of the PVD method include a vacuum evaporation method, a sputtering method, an ion-plating method, and a laser ablation method. The types of the CVD method include a hot CVD method and a plasma CVD method.

Insulating Layer

The insulating layer is provided to suppress short-circuiting between the positive- and negative-electrode layers. Consequently, it is desirable that the insulating layer be formed by using a material having an electronic conductivity as small as ignorable. The insulating layer may be formed by using either inorganic material or organic material. The types of inorganic material include LiF, alumina, and glass. The types of organic material include polyethylene, polypropylene, and polyimide film. In particular, of the resins, polyimide film has resistance to heat against the heating temperature (200° C. to 250° C. or so) at the time of the reflow soldering. In addition, various photoresist materials can be used to form the insulating layer. In this case, by applying the photolithographic technique, the insulating layer can be microprocessed to obtain the specified shape. The types of photoresist material include cyclorubber—bisazide-based photoresist, diazo naphthoquinone—novolac resin, azide compound-based photoresist, KrF excimer laser-use chemically amplified resist, and ArF excimer laser-use chemically amplified resist. It is desirable that the insulating layer have a thickness of 0.5 to 20 μm or so, more desirably 2 to 10 μm. In particular, it is desirable that the thickness be at least 3 μm to suppress the formation of pinholes. When an insulating layer made of resin is used, it is easy to give flexibility to the battery to be formed.

Method of Forming Insulating Layer

The insulating layer can be provided either by applying a resinous material dissolved in a solvent to a specified forming place or by using a photolithographic technique or a vapor deposition method to form an insulating layer having a specified shape. In addition, an insulating layer formed by cutting an existing plastic film using a laser-cutting method or the like to obtain a specified shape may be bonded to a specified forming place. In particular, the insulating layer formed by applying the resinous material is less likely to form a pinhole.

Substrate

Usually, two types of substrates are used: one is a conductive substrate, on which the positive-electrode layer, negative-electrode layer, electrolytic layer, and insulating layer are laminated, and the other is an insulating substrate, on which first a collector layer is formed and then the positive-electrode layer, negative-electrode layer, electrolytic layer, and insulating layer are laminated. As for the material of the substrate, the following substrates may be used, for example: an insulating substrate made of alumina, glass, polyimide film, or the like, a semiconductor substrate made of silicon or the like, and a conductive substrate made of platinum, gold, iron, nickel, aluminum, copper, stainless steel, or the like. These materials have resistance to heat against the heating temperature (200° C. to 250° C. or so) at the time of the reflow soldering. It is desirable that the substrate have a thickness of 3 to 80 µm or so, more desirably 5 to 25 µm. When a substrate made of resin is used, it is easy to give flexibility to the battery to be formed.

Collector

Each of the positive- and negative-electrode layers is usually provided with a bonded collector. A metal foil or the like is suitable for forming a collector. The negative-electrode-side collector may be made of one material selected from the group consisting of copper (Cu), nickel (Ni), iron (Fe), chromium (Cr), and alloys of these, for example. These metals do not form intermetallic compounds with lithium (Li). Consequently, troubles caused by the intermetallic compound with lithium can be prevented. Examples of the foregoing troubles are shown below. First, the negative-electrode layer expands or contracts due to the charging or discharging. As a result, the negative-electrode layer may suffer structural breakdown, decreasing the current-collecting ability. In another case, the negative-electrode layer may decrease its bonding ability, rendering it likely to separate from the collector. The positive-electrode-side collector may be formed by using one member selected from the group consisting of aluminum (Al), nickel (Ni), Al—Ni alloy, and stainless steel.

The above-described collectors can be formed through the PVD or CVD method. In particular, when the collector is formed with a specified shape, the use of a proper mask can facilitate the formation of the collector with the specified shape.

Other Structures

In the battery of the present invention, it is desirable that at least one of the positive-electrode layer and the negative-electrode layer be formed with a complicated planar shape. The complicated planar shape needs only to be a shape that allows to form the longest possible outer-edge line. The types of the shape satisfying the foregoing requirement include a comb-tooth shape and a spiral. When the electrode layer has a comb-tooth shape, a rectangular thin-film battery can be formed easily. When the electrode layer has the shape of a spiral, a circular thin-film battery can be formed easily. When one of the electrode layers is formed with a complicated planar shape, it is desirable that the other electrode layer have a simple planar shape. This condition eliminates the necessity of a highly precise positioning of the two electrode layers. The highly precise positioning is required if both electrode layers have complicated planar shapes. The types of the simple planar shape include a circle, rectangle, and polygon, each of which can have a shorter outer-edge line than that of a complicated planar shape. In particular, when the electrode layer having a simple planar shape is made larger than the electrode layer having a complicated planar shape, the electrode layer having a complicated planar shape can be easily laminated above the electrode layer having a simple planar shape.

When the battery is viewed from above, it is desirable that the spacing L between the outer-edge line of the insulating layer and that of the electrode layer on or above the insulating layer be 5 to 200 µm. If the L is excessively small, at the time the electrode layer is formed on or above the insulating layer, it is difficult to precisely position the electrode layer to the insulating layer. Conversely, if the L is excessively large, the resistance between the two electrode layers becomes large, which is not desirable. It is more desirable that the spacing L be at most 100 µm.

It is desirable that the thickness of the battery as a whole, i.e., the total thickness of the positive-electrode layer, negative-electrode layer, electrolytic layer, and insulating layer, be 15 to 500 µm or so. When the foregoing thickness is achieved, an extremely thin battery can be structured. In particular, it is desirable that the battery have a thickness of at most 300 µm.

In a battery, it frequently occurs that the battery capacity, expressed in $mAh/cm^2$, of the positive-electrode layer does not coincide with that of the negative-electrode layer. In this case, it is desirable that the electrode layer having a larger battery capacity have a complicated planar shape with a smaller area and that the electrode layer having a smaller battery capacity have a simple planar shape with a larger area. For example, when the negative-electrode layer has a considerably larger battery capacity than that of the positive-electrode layer, only the negative-electrode layer, which has a larger battery capacity, is formed with the shape of the teeth of a comb and the positive-electrode layer is formed with the shape of a rectangle. By employing the above-described design, the battery can satisfy the requirement of miniaturization and capacity increase as a whole.

Example 1

FIG. 1 shows a vertical sectional view of a battery of the present invention. This battery is a thin-film Li-ion battery provided with a substrate 10 on which a positive-electrode layer 20, an insulating layer 30, an electrolytic layer 40, and a negative-electrode layer 50 are formed successively.

First, the positive-electrode layer 20 that has a rectangular shape and that is made of $LiCoO_2$ is formed on the substrate 10 made of metal through the excimer laser ablation method. Next, the insulating layer 30 that has a rectangular shape and that is made of LiF is formed at an area on the positive-electrode layer 20 through the evaporation method. In this case, the insulating layer 30 is formed only at nearly the center portion of the positive-electrode layer 20. Then, the electrolytic layer 40 is formed so as to cover the entire area of the insulating layer 30 and the positive-electrode layer 20. In this case, the electrolytic layer 40 composed of lithium (Li), phosphorus (P), sulfur (S), and oxygen (O) was formed through the excimer laser ablation method. Finally, the negative-electrode layer 50 that has a rectangular shape and that has a smaller area than that of the insulating layer 30 is formed so as to be overlaid on the electrolytic layer 40 and the insulating layer 30. In this case, a metallic lithium film was formed as the negative-electrode layer 50 through the evaporation method. As a result, the relationship between the areas of the positive-electrode layer 20, the negative-electrode layer 50, and the insulating layer 30 becomes as follows: the positive-electrode layer 20>the insulating layer 30>the negative-electrode layer 50. The individual layer has a thickness as follows: the substrate: 10 µm, the positive-electrode layer: 100 µm, the insulating layer: 5 µm, the electrolytic layer: 5 µm, and the negative-electrode layer: 3 µm. When this battery undergoes charging and discharging, Li ions travel mostly along the electrolytic layer 40 existing on the insulating layer 30 to carry out the ionic conduction between the positive- and negative-electrode layers.

The battery having the above-described structure is provided with the insulating layer 30 between the positive-electrode layer 20 and the negative-electrode layer 50. Furthermore, there is no place where the positive-electrode layer 20 and the negative-electrode layer 50 face each other through only the electrolytic layer 40. Therefore, even when the electrolytic layer 40 has a pinhole, the presence of the insulating layer 30 can suppress short-circuiting between the positive and negative electrodes. In particular, because the structure of this example provides two layers, i.e., the insulating layer 30 and the electrolytic layer 40, between the positive-electrode layer 20 and the negative-electrode layer 50, the above-described short-circuiting can be prevented more reliably. What is more, this battery has a structure in which the positive-electrode layer 20 and the negative-electrode layer 50 are laminated with each other. Consequently, the battery can have a smaller battery area than that of a battery having a structure in which the two electrode layers are juxtaposed on the same plane. In addition, a gold comb-tooth-shaped electrode was formed on an electrolytic layer on a glass plate to measure the complex impedance. The result showed that the electrolytic layer had an ionic conductivity of $2 \times 10^{-4}$ S/cm.

This example can be modified by exchanging the positive-electrode layer and the negative-electrode layer for each other. More specifically, first, the negative-electrode layer is formed on the substrate. The insulating layer is formed at an area on the negative-electrode layer. The electrolytic layer is formed so as to cover the entire area of the negative-electrode layer and the insulating layer. Finally, the positive-electrode layer is formed on the electrolytic layer so as to be overlaid on the electrolytic layer and the insulating layer. This structure can also effectively prevent short-circuiting between the positive- and negative-electrode layers.

Production of Samples

One hundred batteries in Example 1 of the present invention and one hundred comparative batteries were produced. The comparative battery was produced by eliminating the insulating layer from the battery in Example 1. Thus, an examination was conducted to clarify the effect of short-circuiting between the positive and negative electrodes on the production yield. The result showed that whereas no defective battery due to short-circuiting was produced for the batteries of the present invention, 38 percent of the produced batteries were faulty for the comparative batteries. This result confirmed that the battery of the present invention, which is provided with the insulating layer, has a high production yield.

Example 2

Figure 2:
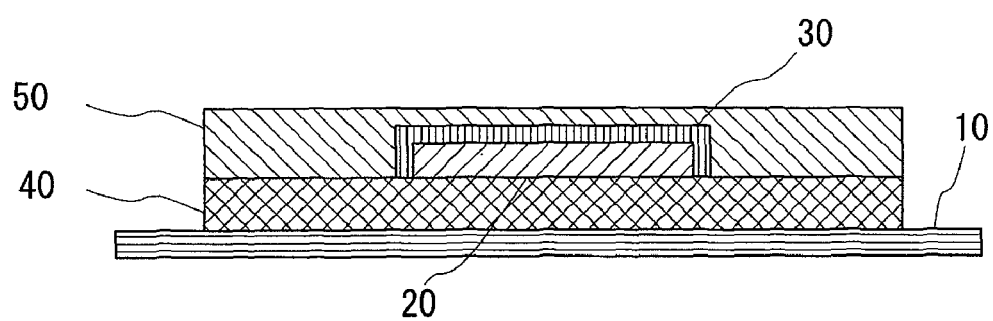
FIG. 2 is a vertical sectional view of the battery in Example 2 of the present invention.

A battery of the present invention, which has a structure different from the one shown in FIG. 1, is explained below referring to FIG. 2. As with Example 1, this battery is also a thin-film Li-ion battery provided with a substrate 10, a positive-electrode layer 20, an insulating layer 30, an electrolytic layer 40, and a negative-electrode layer 50. The materials and forming methods of the individual layers are the same as those in Example 1.

In this battery, first, the electrolytic layer 40 that has the shape of a flat plate is formed on the substrate 10. The positive-electrode layer 20 is formed at an area on the electrolytic layer 40. Then, the insulating layer 30 is formed so as to cover the positive-electrode layer 20. The insulating layer 30 is formed practically at the outside of the positive-electrode layer 20 and is not formed on the place of the electrolytic layer 40 not covered by the positive-electrode layer 20. In other words, the cross section of the insulating layer 30 is formed so as to have the shape of a square bracket. The negative-electrode layer 50 covers the insulating layer 30 and the exposed portion of the electrolytic layer 40. As a result, the relationship between the areas of the positive-electrode layer 20, the negative-electrode layer 50, and the insulating layer 30 becomes as follows: the positive-electrode layer 20<the insulating layer 30<the negative-electrode layer 50. When this battery undergoes charging and discharging, Li ions travel between the underside of the positive-electrode layer 20 and the underside of the negative-electrode layer 50 and through the electrolytic layer 40 to carry out the ionic conduction between the positive- and negative-electrode layers.

The battery having the above-described structure is provided with the insulating layer 30 between the positive-electrode layer 20 and the negative-electrode layer 50. Furthermore, there is no place where the positive-electrode layer 20 and the negative-electrode layer 50 face each other through only the electrolytic layer 40. Therefore, even when the electrolytic layer 40 has a pinhole, the presence of the insulating layer 30 can suppress short-circuiting between the positive and negative electrodes. What is more, this battery has a structure in which the positive-electrode layer 20 and the negative-electrode layer 50 are laminated with each other. Consequently, the battery can have a smaller battery area than that of a battery having a structure in which the two electrode layers are juxtaposed on the same plane.

This example can be modified by exchanging the positive-electrode layer and the negative-electrode layer for each other. More specifically, first, as with the case shown in FIG. 2, the electrolytic layer is formed on the substrate. In this case, however, the negative-electrode layer is formed at an area on the electrolytic layer. Then, the insulating layer is formed so as to cover the negative-electrode layer. The positive-electrode layer is formed so as to cover both the insulating layer and the exposed portion of the electrolytic layer. This structure can also effectively prevent short-circuiting between the positive- and negative-electrode layers.

Example 3

Figure 3:
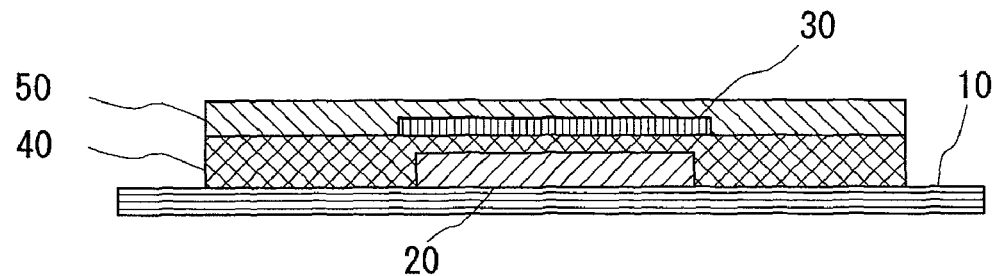
FIG. 3 is a vertical sectional view of the battery in Example 3 of the present invention.

A battery, which has a structure different from that of the above-described examples, is explained below referring to FIG. 3. As with Example 1, this battery is also a thin-film Li-ion battery provided with a substrate 10, a positive-electrode layer 20, an insulating layer 30, an electrolytic layer 40, and a negative-electrode layer 50. The materials and forming methods of the individual layers are the same as those in Example 1.

In this battery, first, the positive-electrode layer 20 is formed at an area on the substrate 10. The electrolytic layer 40 is formed so as to cover the positive-electrode layer 20 and the exposed portion of the substrate 10. Then, the insulating layer 30 is formed at an area on the electrolytic layer 40. The insulating layer 30 has an area larger than that of the positive-electrode layer 20 and is placed so as to cover the positive-electrode layer 20. The negative-electrode layer 50 is formed so as to cover the insulating layer 30 and the exposed portion of the electrolytic layer 40. As a result, the relationship between the areas of the positive-electrode layer 20, the negative-electrode layer 50, and the insulating layer 30 becomes as follows: the positive-electrode layer 20<the insulating layer 30<the negative-electrode layer 50. When this battery undergoes charging and discharging, Li ions travel mostly along the electrolytic layer 40 existing under the insulating layer 30 to carry out the ionic conduction between the positive- and negative-electrode layers.

The battery having the above-described structure is provided with the insulating layer 30 between the positive-electrode layer 20 and the negative-electrode layer 50. Furthermore, there is no place where the positive-electrode layer 20 and the negative-electrode layer 50 face each other through only the electrolytic layer 40. Therefore, even when the electrolytic layer 40 has a pinhole, the presence of the insulating layer 30 can suppress short-circuiting between the positive and negative electrodes. In particular, because the structure of this example provides two layers, i.e., the insulating layer 30 and the electrolytic layer 40, between the positive-electrode layer 20 and the negative-electrode layer 50, the above-described short-circuiting can be prevented more reliably. What is more, this battery has a structure in which the positive-electrode layer 20 and the negative-electrode layer 50 are laminated with each other. Consequently, the battery can have a smaller battery area than that of a battery having a structure in which the two electrode layers are juxtaposed on the same plane.

This example can be modified by exchanging the positive-electrode layer and the negative-electrode layer for each other. More specifically, first, the negative-electrode layer is formed at an area on the substrate. The electrolytic layer is formed so as to cover the negative-electrode layer and the exposed portion of the substrate. Then, the insulating layer is formed at an area on the electrolytic layer. The insulating layer has an area larger than that of the negative-electrode layer and is placed so as to cover the negative-electrode layer. The positive-electrode layer is formed so as to cover the insulating layer and the exposed portion of the electrolytic layer. This structure can also effectively prevent short-circuiting between the positive- and negative-electrode layers.

Example 4

Figure 4:
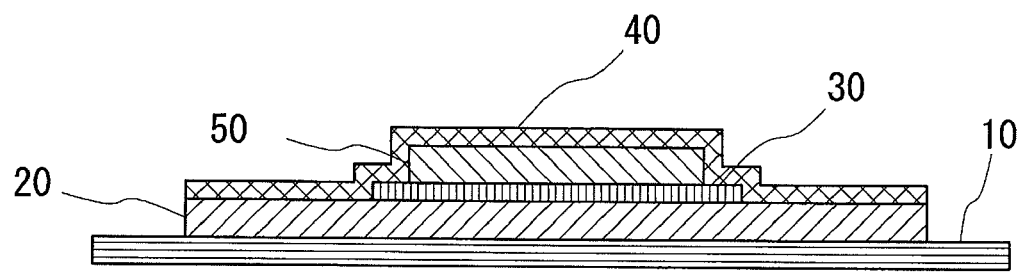
FIG. 4 is a vertical sectional view of the battery in Example 4 of the present invention.

A battery, which has a structure different from that of the above-described examples, is explained below referring to FIG. 4. As with Example 1, this battery is also a thin-film Li-ion battery provided with a substrate 10, a positive-electrode layer 20, an insulating layer 30, an electrolytic layer 40, and a negative-electrode layer 50. The materials and forming methods of the individual layers are the same as those in Example 1.

In this battery, first, the positive-electrode layer 20 is formed on the substrate 10. The insulating layer 30 is formed at an area on the positive-electrode layer 20. Then, the negative-electrode layer 50 is formed at an area on the insulating layer 30. The electrolytic layer 40 is formed so as to cover the negative-electrode layer 50, the exposed portion of the insulating layer 30, and the exposed portion of the positive-electrode layer 20. As a result, the relationship between the areas of the positive-electrode layer 20, the negative-electrode layer 50, and the insulating layer 30 becomes as follows: the positive-electrode layer 20>the insulating layer 30>the negative-electrode layer 50. When this battery undergoes charging and discharging, Li ions travel mostly along the electrolytic layer 40 existing on the insulating layer 30 to carry out the ionic conduction between the positive- and negative-electrode layers.

The battery having the above-described structure is provided with the insulating layer 30 between the positive-electrode layer 20 and the negative-electrode layer 50. Furthermore, there is no place where the positive-electrode layer 20 and the negative-electrode layer 50 face each other through only the electrolytic layer 40. Therefore, even when the electrolytic layer 40 has a pinhole, the presence of the insulating layer 30 can suppress short-circuiting between the positive and negative electrodes. What is more, this battery has a structure in which the positive-electrode layer 20 and the negative-electrode layer 50 are laminated with each other. Consequently, the battery can have a smaller battery area than that of a battery having a structure in which the two electrode layers are juxtaposed on the same plane.

This example can be modified by exchanging the positive-electrode layer and the negative-electrode layer for each other. More specifically, first, the negative-electrode layer is formed on the substrate. The insulating layer is formed at an area on the negative-electrode layer. Then, the positive-electrode layer is formed at an area on the insulating layer. The electrolytic layer is formed so as to cover the positive-electrode layer, the exposed portion of the insulating layer, and the exposed portion of the negative-electrode layer. This structure can also effectively prevent short-circuiting between the positive- and negative-electrode layers.

Example 5

Figure 5:
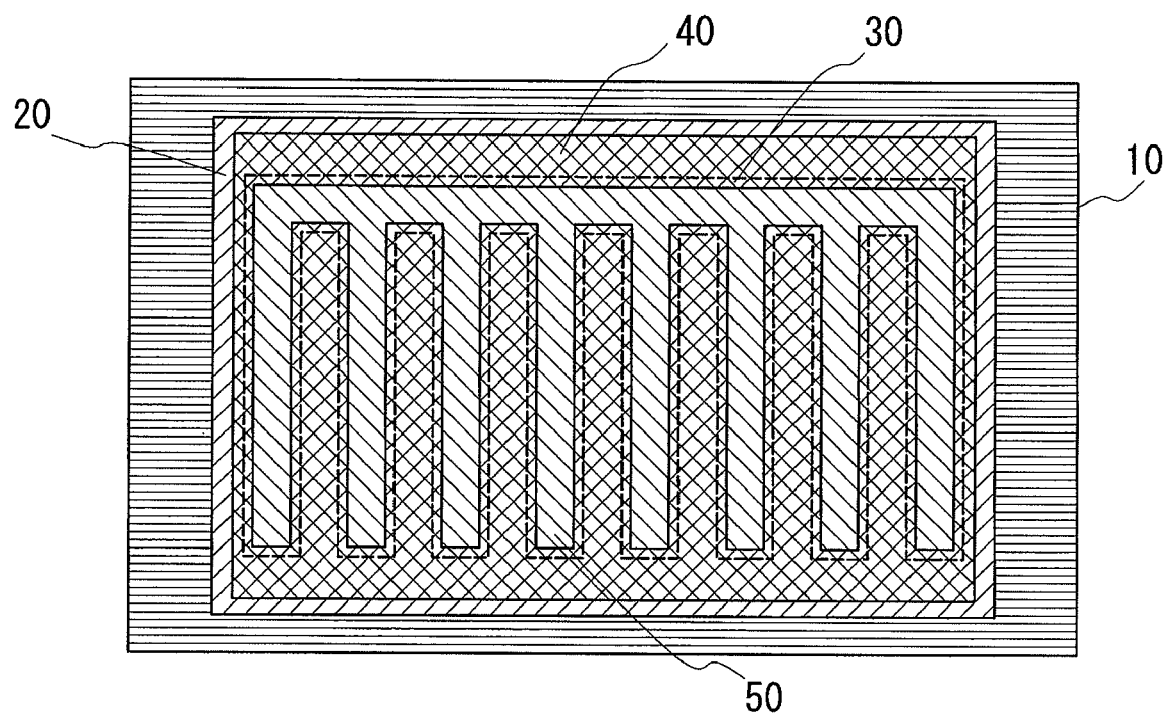
FIG. 5 is a plan view of the battery in Example 5 of the present invention.

A battery, which has a structure different from that of the above-described examples, is explained below referring to FIG. 5. As with Example 1, this battery is also a thin-film Li-ion battery provided with a substrate 10, a positive-electrode layer 20, an insulating layer 30, an electrolytic layer 40, and a negative-electrode layer 50. The materials and forming methods of the individual layers are the same as those in Example 1.

In this example, however, the shapes of the insulating layer 30 and the negative-electrode layer 50 are different from those of the battery in Example 1. First, in the battery in this example, the positive-electrode layer 20 having the shape of a rectangle is formed on the substrate 10. The insulating layer 30 having the shape of the teeth of a comb is formed at an area on the positive-electrode layer 20. Then, the electrolytic layer 40 is formed so as to cover most part of the positive-electrode layer 20 and the entire surface of the insulating layer 30. The negative-electrode layer 50 having the shape of the teeth of a comb is formed on the electrolytic layer 40 so as to be positioned at the area under which the insulating layer 30 is provided. The negative-electrode layer 50 has an area smaller than that of the insulating layer 30. As a result, the relationship between the areas of the positive-electrode layer 20, the negative-electrode layer 50, and the insulating layer 30 becomes as follows: the positive-electrode layer 20>the insulating layer 30>the negative-electrode layer 50. When this battery undergoes charging and discharging, Li ions travel mostly along the electrolytic layer 40 existing on the insulating layer 30 to carry out the ionic conduction between the positive- and negative-electrode layers.

As with Example 1, the battery having the foregoing structure can also suppress short-circuiting between the positive-electrode layer 20 and the negative-electrode layer 50 because of the presence of the insulating layer 30. Moreover, in the structure of this example, the negative-electrode layer 50 has a significantly longer outer-edge line than that of a negative-electrode layer having the shape of a simple rectangle. In this battery, the ionic conduction is performed from the outer-edge line of the negative-electrode layer 50 to the positive-electrode layer 20 through the electrolytic layer 40. Consequently, the long outer-edge line of the negative-electrode layer 50 can secure more conduction routes for the ions. Therefore, the battery of this example having a comb-tooth-shaped electrode layer can realize a battery with a higher output. When the battery was viewed from above, the spacing L between the outer-edge line of the insulating layer 30 and that of the negative electrode layer 50 was 100 μm.

INDUSTRIAL APPLICABILITY

The battery of the present invention can be applied to various primary and secondary batteries. In particular, having no electrolysis solution, the battery can be suitably used as an all-solid-state lithium secondary battery having excellent safety, resistance to heat, and low-temperature performance. For example, this battery is expected to be used as the power source for a mobile type, a portable type, and other various types of electric and electronic apparatuses. In addition, the battery of the present invention can also be suitably used, for example, as a battery for an electronic circuit board to be subjected to a reflow process that performs a collective soldering of the wiring in a heating furnace, as a backup power source to be used in an electronic circuit of an automobile or the like, and as a main power source required to have resistance to heat.

The invention claimed is:

1. A battery, comprising a positive-electrode layer, a negative-electrode layer, and an electrolytic layer through which ionic conduction is performed between the positive-electrode layer and the negative-electrode layer;
wherein:
   (a) the positive-electrode layer and the negative-electrode layer are laminated with each other;
   (b) an insulating layer is placed between the positive-electrode layer and the negative-electrode layer;
   (c) the insulating layer has an area smaller than that of one of the positive-electrode layer and the negative-electrode layer and larger than that of the other; and
   (d) there is no place where the positive-electrode layer and the negative-electrode layer face each other through only the electrolytic layer.

2. The battery as defined by claim 1, the battery being a primary battery.

3. The battery as defined by claim 1, the battery being a secondary battery.

4. The battery as defined by claim 1, wherein one of the positive-electrode layer and the negative-electrode layer has a simple planar shape and the other has a planar shape having an outer-edge line longer than that of the simple planar shape.

5. The battery as defined by claim 1, wherein the positive-electrode layer, the negative-electrode layer, the electrolytic layer, and the insulating layer are all composed of materials having resistance to heat against the temperature of 200° C. to 250° C. or so at the time the battery undergoes reflow soldering.

6. The battery as defined by claim 1, wherein the electrolytic layer and the insulating layer are placed between the positive-electrode layer and the negative-electrode layer.

* * * * *